United States Patent
Miller et al.

(10) Patent No.: US 7,707,458 B2
(45) Date of Patent: Apr. 27, 2010

(54) SELF-TEST SYSTEM

(75) Inventors: Peter John Miller, Shefford (GB); Andrew Charles Osborne Smith, Coventry (GB); Michael John Lindsey, Dorser (GB)

(73) Assignee: Ricardo UK Limited, Shoreman-By-Sea, West Sussex (GB)

( * ) Notice: Subject to any disclaimer, the term of this patent is extended or adjusted under 35 U.S.C. 154(b) by 385 days.

(21) Appl. No.: 10/522,440

(22) PCT Filed: Jul. 18, 2003

(86) PCT No.: PCT/GB03/03141
§ 371 (c)(1),
(2), (4) Date: Nov. 29, 2005

(87) PCT Pub. No.: WO2004/010299
PCT Pub. Date: Jan. 29, 2004

(65) Prior Publication Data
US 2006/0150016 A1    Jul. 6, 2006

(30) Foreign Application Priority Data
Jul. 18, 2002 (GB) ............................ 0216742.7

(51) Int. Cl.
*G06F 11/00* (2006.01)
(52) U.S. Cl. ..................................... 714/25; 700/8
(58) Field of Classification Search .............. 714/25; 700/8
See application file for complete search history.

(56) References Cited

U.S. PATENT DOCUMENTS

| | | | | |
|---|---|---|---|---|
| 4,270,808 A | * | 6/1981 | Brearley | 303/122.05 |
| 4,943,919 A | * | 7/1990 | Aslin et al. | 701/3 |
| 5,079,496 A | * | 1/1992 | Pierret et al. | 322/28 |
| 6,208,955 B1 | * | 3/2001 | Provan et al. | 703/20 |
| 7,035,834 B2 | * | 4/2006 | Jacobson | 706/26 |

FOREIGN PATENT DOCUMENTS

SU    1619279 A    *    1/1991

* cited by examiner

Primary Examiner—Ramesh B Patel
Assistant Examiner—Tejal J Gami
(74) Attorney, Agent, or Firm—Cowan, Liebowitz & Latman, P.C.

(57) ABSTRACT

An electronic system comprising a system to be monitored (2) and a plurality of fault-monitoring systems (4, 6) each of which is adapted to output a fault signal when an input indicates that the electronic system is in a fault condition associated with the fault-monitoring system. The fault-monitoring systems are arranged in a cascade fashion such that a fault signal output from one fault-monitoring system (4) is provided as an input to a subsequent fault-monitoring system (6) in the cascade of fault-monitoring systems to simulate a fault condition associated with the subsequent fault-monitoring system. The output of the final fault-monitoring system in the cascade gives an indication of whether there is a fault with any of the fault-monitoring systems.

12 Claims, 2 Drawing Sheets ents of an
SELF-TEST SYSTEM

This invention relates to a self-test process and apparatus that has inherent self-testing capabilities, for use with control system, in particular but not exclusively for use in vehicles.

Electronic systems that are used in systems where a failure may have serious consequences need various fault monitoring systems to ensure such faults are detected and suitable corrective action taken. Many such fault monitoring systems are known (for example a comparator can be used to compare a supply voltage with a fixed reference voltage, generating an error whenever the supply voltage is under (or over) the reference). Given that failures are a rare event, it is possible for faults to develop in the fault monitoring systems before the faults they are designed to detect occur. If these faults go undetected, it is then possible that when a more serious fault occurs (one that the fault monitoring system was designed to detect) this will go undetected with serious consequences.

Based on the foregoing there is clearly a need for a way of monitoring the fault-monitoring systems themselves.

The invention will now be described, by way of example only, with reference to the accompanying drawings, in which like reference numerals refer to similar elements and in which.

A method and apparatus for self-testing an electronic system is described. In the following description, for the purposes of explanation, numerous specific details are set forth to provide a thorough understanding of the present invention. It will be apparent to a person skilled in the art that the present invention may be practiced without these specific details. In other instance, well-known structures and devices are shown in block diagram form to avoid unnecessarily obscuring the present invention.

The needs identified above and other needs and objects that will become apparent from the following description are achieved in the present invention which comprises, in one aspect, an electronic system comprising a system to be monitored and a plurality of fault-monitoring systems. Each of the fault-monitoring systems is adapted to output a fault signal when an input indicates that the electronic system is in a fault condition associated with the fault-monitoring system. The fault-monitoring systems are arranged in a cascade fashion such that a fault signal output from one fault-monitoring system is provided as an input to a subsequent fault-monitoring system in the cascade of fault-monitoring systems to simulate a fault condition associated with the subsequent fault-monitoring system. The output of the final fault-monitoring system in the cascade gives an indication of whether there is a fault with any of the fault-monitoring systems. Alternatively the outputs of each of the individual fault-monitoring systems may be monitored to indicate whether there is a fault with any of the fault-monitoring systems.

In other aspects, the invention encompasses a method and a computer-readable medium for carrying out the foregoing steps.

The electronic system to be described is part of the electronic system used in a vehicle such as a car but the method is applicable to other electronic systems which include fault-monitoring systems.

Figure 1:
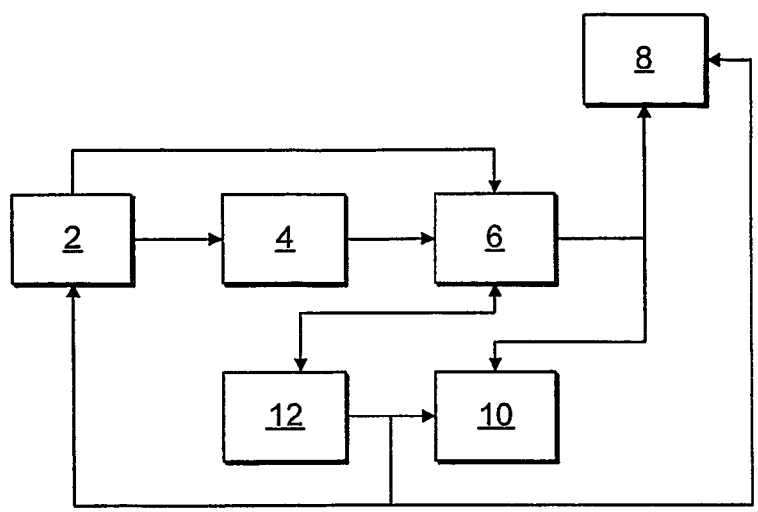
FIG. 1 shows a functional diagram of components of an electronic system incorporating a first embodiment of a self-test system.

FIG. 1 shows an embodiment of a self-testing fault monitoring system. The electronic system incorporates the system to be monitored 2 (which will typically contain a microprocessor), a first fault detection device 4 (which may for example take the form of a watchdog for the processor) and a second (and in this case final) fault detection device 6 (which may for example take the form of a voltage level detector, monitoring the power rails of the processor). A system 8 provides the required action on detection of a fault (for example to switch off the system 2) and non-volatile memory 10 allows storage of a record of the success or failure of the self testing process.

In either of the above fault detection situations, the fault action system 8 is activated either directly, via fault-monitoring system 6, or indirectly, by fault-monitoring system 4 simulating a fault in monitor 6 which then causes the action.

The fault-monitoring systems 4, 6 are designed to monitor for fault conditions. However the electronic system in which these components are implemented has no way of knowing whether the fault condition detectors are operating properly or not. The embodiment shown in the figures allows an electronic system to monitor the fault-monitoring systems. Preferably, a self-test is carried out each time the system is shut down.

Thus when the electronic system is to be shut down, the system 2 being monitored changes its function so as to cause fault detector 4 to detect a fault. If the fault detector circuit 4 is operating properly, then it will generate an output which will cause fault detector 6 to see a fault. A record of this event is stored in the non-volatile memory 10, as well as causing the fault response activator 8 to carry out a response to a fault condition (typically to shut down the system 2). When the system 2 next receives a signal to start up, it checks for the record in the non-volatile memory. If, on start up, such a record is not in the non-volatile memory then the system 2 registers that the fault-monitoring systems did not function correctly and therefore one of the fault-monitoring systems 4, 6 is faulty. The system then takes the appropriate action e.g. shutting itself down after generating an appropriate fault message. If the system 2 determines that the test of the fault detectors was successful, then the record in the non-volatile memory is cleared, ready for the next self-test.

In a further aspect of the invention a partial self-test is also carried out on start up. On switch on, the supply voltage $V_{supp}$ ramps up to the required level. Therefore a self-test of an under-voltage detector (e.g. fault-monitoring system 6) may also be carried out on start up to test whether the under-voltage detector 6 is correctly detecting an under-voltage situation. Thus, on starting operation of the system, a start-up monitor 12 can check that the under voltage fault-monitoring system 6 initially detects a fault (when the supply voltage is low) and then detects no fault (when the supply in within specification). This fault-monitoring system can inform the electronic system being monitored 2 of its result, and/or active the fault-response activator 8, and/or store a record in the non-volatile memory 10.

Figure 2:
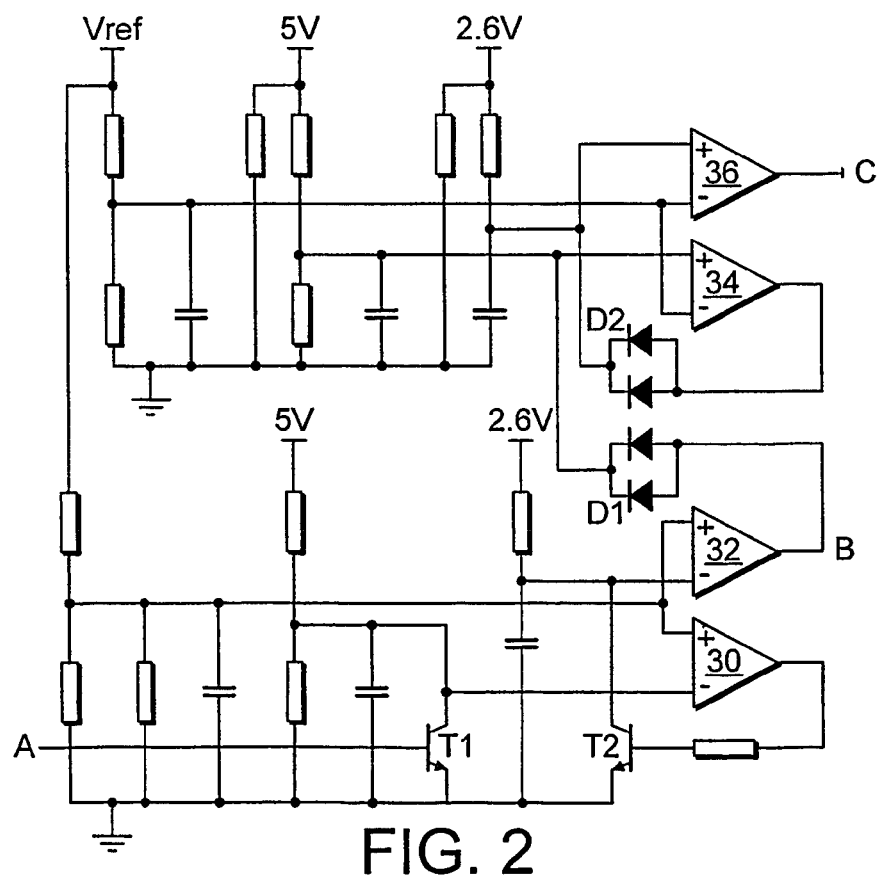
FIG. 2 is a circuit diagram illustrating the an embodiment of the self-test system of FIG. 1.

FIG. 2 shows an embodiment of the fault detection system, comprising under- and over-voltage detectors for two power supply lines (5V and 2.6V).

The actual detection of under/over voltage is performed by the 4 comparators (30, 32, 34, 36). A signal A indicates an input to the first fault-monitoring device comprising comparators 30, 32. Transistor T1 allows the system to induce a fault into the first comparator 30 which via T2 induces a fault in the second comparator 32. The fault signal B output from the comparator 32 then induces a fault in the next fault-monitoring device comprising comparators 34, 36. Thus fault signal B output from the comparator 32 induces a fault in the next comparator 34 via D1 and in turn comparator 34 induces a fault in the last comparator 36 via D2. The fault signal C output from the second fault-monitoring system (comprising comparators 34, 36) is then used to trigger the fault response activator 8.

In an implementation as shown in this first embodiment described with reference to FIGS. 1 and 2, there are two fault-monitoring devices: at the beginning of the cascade of fault-monitoring devices there is a watchdog system 4 (or similar) connected to a microprocessor, while at the far end of the cascade a fault output signal from the second fault monitoring system 6 turns the system off (or resets the microprocessor).

In a further development, when the electronic system is placed into a fault condition for which the first fault-monitoring device is monitoring, a flag or value (e.g. 1) is stored in the non-volatile memory 10. If the microprocessor of the electronic system 2 is still running after a given period of time (i.e. the microprocessor has not shut down), then the cascade is triggered. The processor then writes a different value (e.g. 2) to the non-volatile memory 10 and switches off. On start up, by examining the non-volatile memory, the reason for the stop can be found. The value should be erased after reading so that a real fault can be distinguished from a "test" fault.

Although FIGS. 1 and 2 show embodiments in which only two fault monitoring systems (4 and 6) are provided, it will be apparent that there further fault-monitoring systems may be provided. In this case, the output of a first fault-monitoring system may be provided as the input to a second, the output of the second may be input to a third, and so on.

Figure 3:
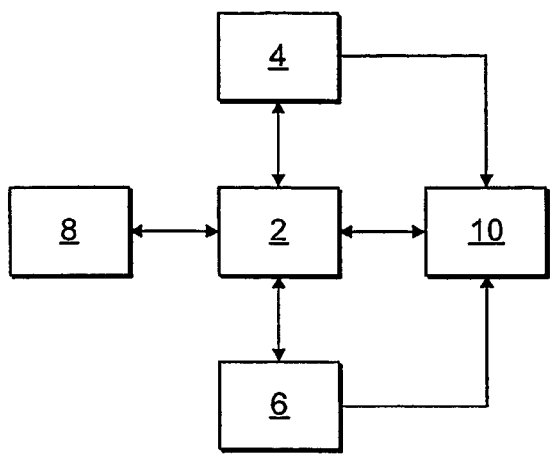
FIG. 3 shows a functional diagram of components of an electronic system incorporating a second embodiment of a self-test system.

FIG. 3 shows a second embodiment of a self test system. The electronic system incorporates a system to be monitored 2 (typically including at least one processor), a first fault-monitoring device in the form of a voltage level detector 4 and a second fault-monitoring device in the form of a watchdog circuit 6. A second processor 8 may also be provided to monitor the operation of the first processor 2. Non-volatile memory 10 may be provided to store fault history records.

The voltage level detector 4 includes an op-amp, a first (non-inverting) input of which is connected to the supply voltage $V_{supp}$ and the second, inverting, input of which is connected to a reference voltage $V_{ref}$. In use, the supply voltage of the electronic system is likely to change. For instance, when the electronic system is powered up, the voltage will increase from nominally 0V to a voltage in the region of that required by the electronic system e.g. 3V. During this ramp-up stage, the voltage may overshoot the required supply voltage. This results in a so-called over-voltage situation. As this over-voltage may result from some fault with the power supply of the electronic system, this is deemed to be a fault situation.

When the magnitude of the supply voltage is greater than the magnitude of the reference voltage, the op-amp produces an output signal and hence the voltage level detector 4 outputs a fault signal.

The watchdog circuit 6 receives as an input a signal from the processor 2 to indicate that the processor is operating correctly. In normal conditions, the signal is output from the processor 2 in a periodic manner. If the watchdog circuit does not receive the signal when it is expecting a signal, the processor is determined to be in an abnormal state and the watchdog circuit 6 outputs a fault signal in the form of a reset signal.

In either of these fault detection situations, the processor is reset i.e. the operation of the processor is stopped and restarted.

The level detector 4 and the watchdog circuit 6 are designed to monitor for fault conditions. However the electronic system in which these components are implemented has no way of knowing whether the fault condition detectors are operating properly or not. Thus, a self-test is carried out each time the microprocessor is shut down, either because of a reset or because the associated system has been turned off.

Thus, according to a first aspect, when the electronic system is to be shut down, the processor monitors for the detection of an over voltage condition. If the level detector circuit 4 is operating properly, then the level detector circuit 4 should output an over voltage reset signal on shut down. Thus, when the system, in particular the processor of the electronic system, is shut down, the processor monitors for an over voltage signal at the output from the level detector 4. When an over voltage current occurs on stopping of the operation of the processor 2, a record to this effect is stored in non-volatile memory 10. When the processor 2 next receives a signal to start up, the processor looks for the record in the non-volatile memory. If, on start up, such a record is not in the non-volatile memory then the processor 2 registers that the over voltage monitoring circuit 4 has not detected the over voltage situation on shut down and that therefore the over voltage detection device 4 is faulty. The processor then takes the appropriate action e.g. shutting itself down after generating an appropriate fault message. The record in the non-volatile memory is preferably cleared when this fault message is generated.

An additional or alternative self test may be carried out. This relates to the self testing of the watchdog circuit 6. This self test is done automatically on shut down of the processor 2. When a signal is sent to the processor to cease operation, the processor in response ceases sending the periodic signal to the watchdog circuit 6. The watchdog circuit 6 then detects that it is not receiving the usual periodic signals from the microprocessor 2 and thus generates a reset signal. This is received by the processor 2 and a record of this reset signal is stored in the non-volatile memory 10. The processor 2 then shuts down.

On subsequent commencement of operation of the processor 2, the processor carries out a check to see if the non-volatile memory 10 includes a record of the reset signal generated by the watchdog device 6. When the non-volatile memory does not include such a record, a fault message is then generated and the processor shut down.

Preferably a self test is carried out on shut-down for both the level detector 4 and the watchdog circuit 6. The watchdog self-test may be carried out first, by ceasing the periodic signal from the processor 2 to the watchdog circuit 6, and monitoring for a fault signal from the watchdog circuit. This may then be followed by the level detector self-test.

A self-test may also be carried out on start up. As explained above, the supply voltage $V_{supp}$ ramps up to the required level on start up. Therefore a self-test of the level detector 4 is also carried out on start up to test that the level detector 4 is correctly monitoring an under-voltage situation. Thus on starting operation of the processor, the self-test routing monitors for the generation of a fault signal from the level detector 4. On generation of a fault signal from the fault-monitoring device on starting of the operation of the processor, a record to this effect is stored in the non-volatile memory 10. On subsequent receipt of a message to stop operation of the processor, the processor checks whether the non-volatile memory 10 includes a record of a fault signal and when the non-volatile memory does not include a record of such a fault signal, an alarm signal is generated.

Figure 4:
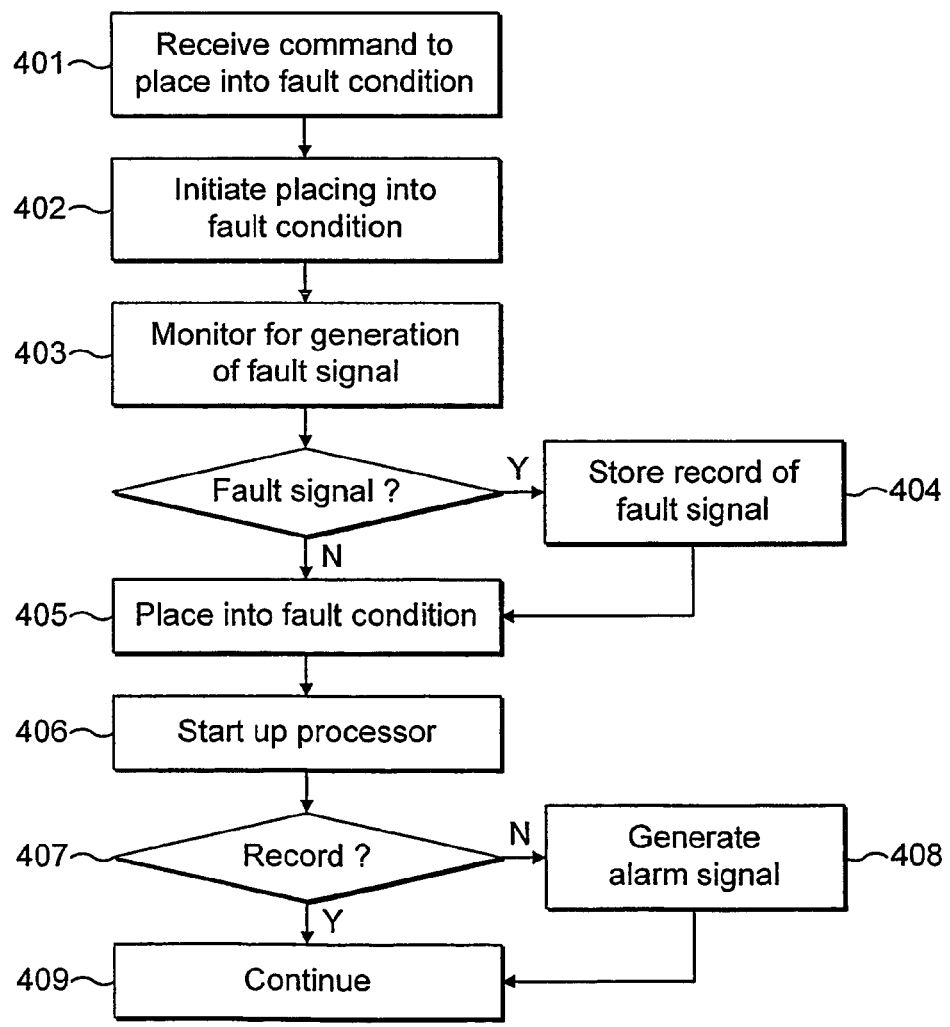
FIG. 4 is a flow diagram illustrating the operation of the self-test system of FIG. 3.

FIG. 4 is a flow diagram showing the operation of the self test program. This routine is run on start up or shut down (e.g. when the ignition of a vehicle is started or on or after a reset or any other reason). In the first step (401) the processor receives a command to enter a fault condition for a first fault-monitoring system e.g. to switch off the processor 2. This may be due to a reset from the watch dog application or the voltage detector (or another fault detection device). The processor then enters the fault condition (402) e.g. the processor initiates cessation of operation, which is intended to generate a fault condition.

The system then runs the self test routine as discussed above i.e. monitors (403) to see whether the watch dog application outputs a fault flag and/or whether the voltage detector outputs the fault flag. If a fault signal is output from the fault-monitoring device, then a record of the fault signal is stored (404) in non-volatile memory. In either case, the processor then shuts down all operations (405).

On subsequent reversion (406) of the system into a non-fault condition e.g. start-up of the processor (406) (either as a result of a reset signal or because the system is powered up by a user), the processor checks (407) whether a record is stored in the non-volatile memory for the self-test that was carried out on shut-down. If no such record is present in the non-volatile memory, then an alarm signal is generated (408). This alarm signal or message indicates that the associated fault detection component is not operating properly. In response, the processor would usually shut down until the fault is cleared. However if the non-volatile memory does include a record for the associated fault detection component, the electronic system can continue to operate as normal (409).

If an under-voltage self-test is also to be carried out, the processor may, before step 409, check for the existence of a record indicating that the level detector 4 detected an under-voltage situation on the previous start-up of the processor. If no such record is detected, an alarm signal may be generated (408). Alternatively the processor may run another sub-routine after step 409 in which the processor shuts itself down and starts itself up again to run the under-voltage routine. This additional stop/start routine will result in a small delay in starting of the processor for normal operation but is unlikely to be noticeable to a user.

The invention thus aims to reduce the risk of a fault in a fault-monitoring system from going undetected by testing the fault monitoring systems. Preferably the fault monitoring systems are tested every time the monitored system is shutdown and restarted (e.g. in the case of a vehicle such as a car this will happen before and after every journey).

In the foregoing specification, the invention has been described with reference to specific embodiments thereof. It will however be evident that various modifications and changes may be made thereto without departing from the broader spirit and scope of the invention. The description and drawings are, accordingly, to be regarded in an illustrative rather than a restrictive sense.

The invention claimed is:

1. An electronic system comprising a system to be monitored having a plurality of output signals, a plurality of fault-monitoring devices each of which is adapted to have a respective first input from the system to be monitored and an output for outputting a fault signal when a respective first input indicates that the system to be monitored is in a fault condition, wherein:

the fault-monitoring devices are arranged in a cascade fashion, a fault-monitoring device having a second input connected to the output of a preceding fault-monitoring device;

the electronic system being adapted to induce a fault-monitoring device of the cascade to output a fault signal, which signal is cascaded as an input to the second input of a subsequent fault-monitoring device;

the electronic system being arranged to determine whether there is a fault with a fault-monitoring device by being arranged to create a record of a fault from the output of the final fault-monitoring device, the absence of a record being created when the electronic system induces a fault signal output signifying a fault in one of the fault-monitoring devices;

wherein a first fault-monitoring device is adapted to output a fault signal when the electronic system is placed into a switched-off condition; and wherein the electronic system is associated with a vehicle and the electronic system is placed into a switched-off condition by turning an ignition key.

2. An electronic system according to claim 1, the electronic system further being arranged to:

place the electronic system into a first fault condition and monitor for a generation of a first fault signal from a first fault-monitoring device, on the generation of a first fault signal from the fault-monitoring device after placing the electronic system into a first fault condition, to input the first fault signal to the second fault-monitoring device, and in response to an output from a final fault-monitoring device to store a record to this effect in non-volatile memory.

3. An electronic system according to claim 2 wherein, on subsequent reversion of the electronic system to a non-fault condition, the electronic system is arranged to check whether the non-volatile memory includes a record and when the non-volatile memory does not include a record on a subsequent reversion, generate an alarm signal.

4. An electronic system according to claim 1 wherein the first fault-monitoring device is a watch-dog system.

5. An electronic system according to claim 1 wherein a second fault-monitoring device has as an input the fault signal from the first fault-monitoring device, the second fault-monitoring system being adapted to output a fault signal when the electronic system experiences an under- or over-voltage condition.

6. An electronic system according to claim 1 further comprising storing a record of a fault signal output by any of the fault-monitoring devices to enable identification of a defective fault-monitoring device.

7. A self-test method for an electronic system comprising a system to be monitored having a plurality of output signals, a plurality of fault-monitoring devices each of which is adapted to have a respective first input from the system to be monitored and an output for outputting a fault signal when a respective first input indicates that the system to be monitored is in a fault condition, the fault-monitoring devices being arranged in a cascade fashion, each fault monitoring device having a second input connected to the output of a preceding fault-monitoring device, the electronic system being adapted to induce a fault monitoring device of the cascade to output a fault signal, which signal is cascaded as an input to the second input of a subsequent fault-monitoring device, the method comprising:

inputting the fault signal from one fault-monitoring device to a subsequent fault-monitoring device to simulate a fault condition associated with the subsequent fault-monitoring device, wherein the output of a final fault-monitoring device in the cascade is used as an indicator of a fault in one of the fault-monitoring devices;

arranging the electronic system to determine whether there is a fault with a fault-monitoring device by being arranged to create a record of a fault from the output of the final fault-monitoring device, the absence of a record being created when the electronic system induces a fault signal output signifying a fault in one of the fault-monitoring devices;

adapting a first fault-monitoring device to output a fault signal when the electronic system is placed into a switched-off condition; and placing the electronic system associated with a vehicle and the electronic system into a switched-off condition by turning an ignition key.

8. A self-test method according to claim 7, further comprising:

placing the electronic system into a first fault condition and monitoring for a generation of a first fault signal from a first fault-monitoring device, on the generation of a first fault signal from the fault-monitoring device after placing the electronic system into a first fault condition, inputting the first fault signal to the second fault-monitoring device, and in response to an output from a final fault-monitoring device storing a record to this effect in non-volatile memory.

9. A self-test method according to claim 8 further comprising, on subsequent reversion of the electronic system to a non-fault condition, checking whether the non-volatile memory includes a record and when the non-volatile memory does not include a record on subsequent reversion, generating an alarm signal.

10. A self-test method according to claim 7 wherein the first fault-monitoring device is a watch-dog system.

11. An electronic system according to claim 7 wherein a second fault-monitoring device has as an input the fault signal from the first fault-monitoring device, the second fault-monitoring system being adapted to output a fault signal when the electronic system experiences an under- or over-voltage condition.

12. A self-test method according to claim 7 further comprising storing a record of a fault signal output by any of the fault-monitoring devices to enable identification of a defective fault-monitoring device.

* * * * *